US011558460B2

(12) United States Patent
Ma

(10) Patent No.: US 11,558,460 B2
(45) Date of Patent: Jan. 17, 2023

(54) DISTRIBUTED PROCESSING METHOD AND APPARATUS BASED ON CONSISTENCY PROTOCOL AND STORAGE MEDIUM

(71) Applicant: TENCENT TECHNOLOGY (SHENZHEN) COMPANY LIMITED, Guangdong (CN)

(72) Inventor: Tong Xing Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 123 days.

(21) Appl. No.: 17/008,765

(22) Filed: Sep. 1, 2020

(65) Prior Publication Data

US 2020/0396290 A1 Dec. 17, 2020

Related U.S. Application Data

(63) Continuation of application No. PCT/CN2019/095595, filed on Jul. 11, 2019.

(30) Foreign Application Priority Data

Jul. 19, 2018 (CN) .......................... 201810798331.2

(51) Int. Cl.
*H04L 67/1097* (2022.01)
*G06F 3/06* (2006.01)
(Continued)

(52) U.S. Cl.
CPC .......... *H04L 67/1097* (2013.01); *G06F 3/067* (2013.01); *G06F 3/0619* (2013.01);
(Continued)

(58) Field of Classification Search
CPC . H04L 67/1097; H04L 41/30; H04L 67/1008; H04L 67/1095; G06F 3/0619;
(Continued)

(56) References Cited

U.S. PATENT DOCUMENTS

2005/0149609 A1 7/2005 Lamport
2006/0136781 A1* 6/2006 Lamport ............. G06F 11/1482
714/25
(Continued)

FOREIGN PATENT DOCUMENTS

CN 103618700 A 3/2014
CN 103916426 A 7/2014
(Continued)

OTHER PUBLICATIONS

International Search Report for PCT/CN2019/095595 dated Oct. 22, 2019 [PCT/ISA/210].
(Continued)

*Primary Examiner* — Kevin T Bates
*Assistant Examiner* — Ranjan Pant
(74) *Attorney, Agent, or Firm* — Sughrue Mion, PLLC

(57) ABSTRACT

A distributed processing method based on a consistency protocol is provided. The method includes: transmitting a decree prepare request including a first decree number, the decree prepare request requesting other nodes to promise to no longer accept a fast write operation initiated by a leader node whose leader number is less than the first decree number, the first decree number representing a leader number of a current node, and the leader number representing a number of a decree at which the current node that becomes a leader node is located; and in response to receiving decree promises from at least a preset quantity of nodes among the other nodes, enabling the fast write operation from a subsequent decree number of a second decree number determined based on the decree promises, each of the decree promises including the first decree number.

20 Claims, 6 Drawing Sheets

(51) Int. Cl.
*H04L 41/00* (2022.01)
*H04L 67/1008* (2022.01)

(52) U.S. Cl.
CPC ............ *G06F 3/0638* (2013.01); *H04L 41/30* (2013.01); *H04L 67/1008* (2013.01)

(58) Field of Classification Search
CPC ................... G06F 3/0638; G06F 3/067; G06F 2206/1012; G06F 3/061; G06F 3/0659; G06F 3/0614; G06F 3/0631
See application file for complete search history.

(56) References Cited

U.S. PATENT DOCUMENTS

| | | | | |
|---|---|---|---|---|
| 2006/0168011 | A1* | 7/2006 | Lamport | H04L 67/1095 709/206 |
| 2009/0165018 | A1* | 6/2009 | Junqueira | G06F 11/2023 709/201 |
| 2012/0254287 | A1* | 10/2012 | Watanabe | G06F 9/5027 709/202 |
| 2014/0344391 | A1* | 11/2014 | Varney | H04L 65/4084 709/213 |
| 2017/0141971 | A1* | 5/2017 | Ainsworth | G06F 11/0751 |
| 2018/0219946 | A1* | 8/2018 | Farrahi Moghaddam | H04L 67/1095 |

FOREIGN PATENT DOCUMENTS

| | | |
|---|---|---|
| CN | 108090222 A | 5/2018 |
| CN | 108924240 A | 11/2018 |

OTHER PUBLICATIONS

Written Opinion of the International Searching Authority dated Oct. 22, 2019 in International English Application No. PCT/CN2019/095595 Translation.

Communication dated Mar. 28, 2022 from the Chinese Patent Office in Chinese Application No. 201810798331.2.

* cited by examiner

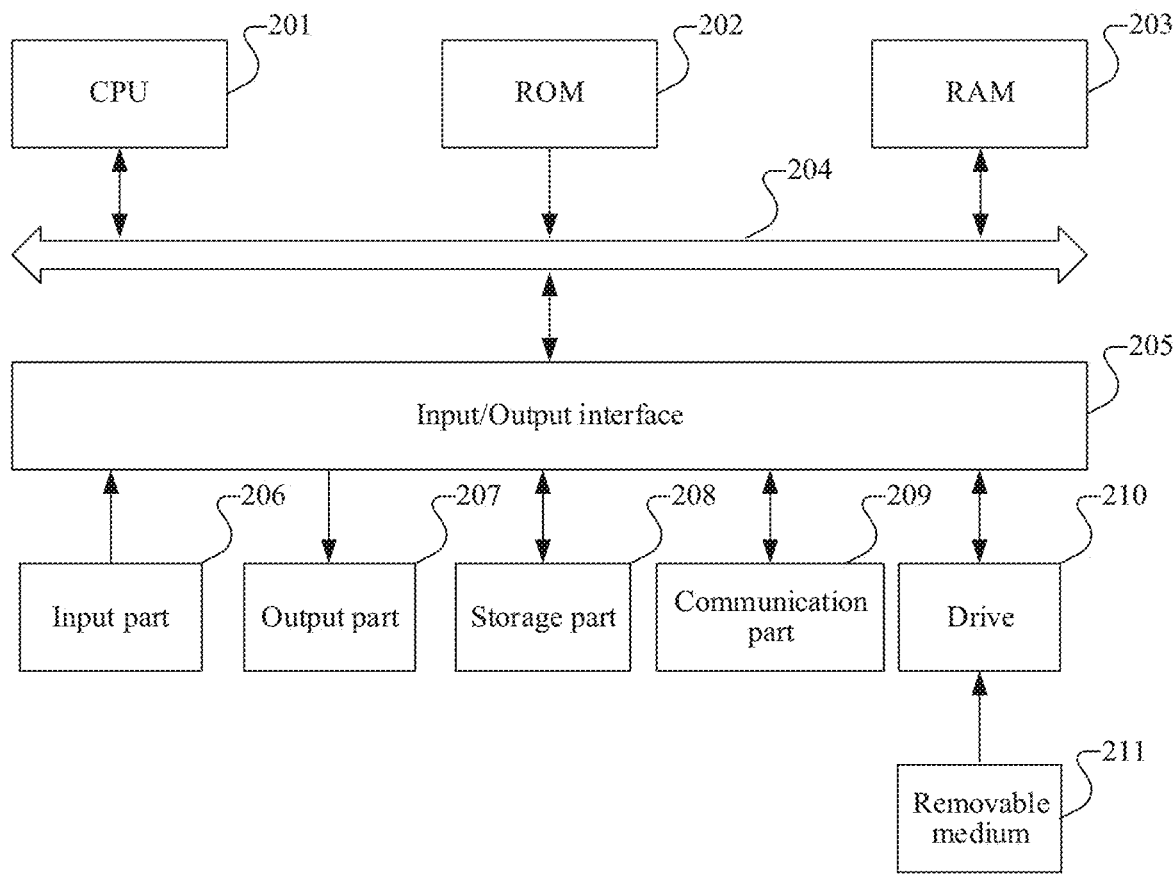

FIG. 2

310 — Transmit a decree prepare request, the decree prepare request carrying a first decree number and being used for representing requesting other nodes to promise to no longer accept a fast write operation initiated by a leader node whose leader number is less than the first decree number 320 — Enable, after it is determined that decree promises are received from a preset quantity of nodes in the other nodes, the fast write operation from a second decree number determined based on the decree promises, the decree promise carrying the first decree number

FIG. 3

DISTRIBUTED PROCESSING METHOD AND APPARATUS BASED ON CONSISTENCY PROTOCOL AND STORAGE MEDIUM

CROSS-REFERENCE TO RELATED APPLICATION(S)

This application is a bypass continuation application of International Application No. PCT/CN2019/095595, filed Jul. 11, 2019, which claims priority to Chinese Patent Application No. 201810798331.2, entitled "DISTRIBUTED PROCESSING METHOD AND APPARATUS BASED ON CONSISTENCY PROTOCOL AND STORAGE MEDIUM" filed with the China National Intellectual Property Administration on Jul. 19, 2018, the disclosures of which are herein incorporated by reference in their entireties.

FIELD

The disclosure relates to the field of computer technologies, and in particular, to a distributed processing method, apparatus, and a system based on a consistency protocol, a computer-readable storage medium, and an electronic device.

BACKGROUND

A distributed processing system is designed such that each device included in the system performs the same operation and stores the same information, thereby implementing complete redundant backup. Even if all devices but one in the system are faulty, a user is allowed to continuously perform effective operations. The Paxos consistency protocol, proposed by Leslie Lamport in 1990, is one of the most effective fundamental theories for implementing the distributed processing system. Data transmission among a plurality of servers is performed by using a procedure and an algorithm defined by the Paxos protocol. In a case that any communication information may be lost or a server is faulty, data of the plurality of servers can still remain consistent.

A complete Paxos protocol procedure normally includes two stages. The first stage is referred to as a prepare-promise stage, during which a node receiving a data operation request initiates, as a proposer, a prepare request to other nodes through broadcasting, and proceeds to the next stage only after receiving promises of most of the nodes. The second stage is referred to as a ballot-vote stage, during which the proposer successfully completing the first stage initiates a ballot for the current operation through broadcasting, and the second stage succeeds after most of the nodes cast votes according to the algorithm defined in the Paxos protocol, representing that the data operation is accepted by the system, and all the nodes have reached consistency on the current data operation.

The first stage and the second stage may be considered as two serial network interaction processes. Complete execution of the two stages can ensure that each data operation of all the nodes remains consistent, but completion of one data operation consumes a relatively long time and causes relatively large network overheads.

SUMMARY

To solve the foregoing problem of a fast write mechanism based on a Paxos consistency protocol in the related art, one or more example embodiments of the disclosure provide a distributed processing method and apparatus based on a consistency protocol, a computer-readable storage medium, and an electronic device.

According to an aspect of an example embodiment of the disclosure, a distributed processing method based on a consistency protocol is provided, the method including: transmitting a decree prepare request including a first decree number, the decree prepare request requesting other nodes to promise to no longer accept a fast write operation initiated by a leader node whose leader number is less than the first decree number, the first decree number representing a leader number of a current node, and the leader number representing a number of a decree at which the current node that becomes a leader node is located; and in response to receiving decree promises from at least a preset quantity of nodes among the other nodes, enabling the fast write operation from a subsequent decree number of a second decree number determined based on the decree promises, each of the decree promises including the first decree number.

According to an aspect of an example embodiment of the disclosure, a distributed processing apparatus based on a consistency protocol is provided, the apparatus including: at least one memory configured to store program code; and at least one processor configured to read the program code and operate as instructed by the program code, the program code including: first transmitting code configured to cause at least one of the at least one processor to transmit a decree prepare request including a first decree number, the decree prepare request requesting other nodes to promise to no longer accept a fast write operation initiated by a leader node whose leader number is less than the first decree number, the first decree number representing a leader number of a current node, and the leader number representing a number of a decree at which the current node that becomes a leader node is located; and enabling code configured to cause at least one of the at least one processor to enable, in response to receiving decree promises from at least a preset quantity of nodes among the other nodes, enable the fast write operation from a subsequent decree number of a second decree number determined based on the decree promises, each of the decree promises including the first decree number.

According to an aspect of an example embodiment of the disclosure, a non-transitory computer readable storage medium storing instructions is provided, the instructions being executable by at least one processor to cause the at least one processor to perform: transmitting a decree prepare request including a first decree number, the decree prepare request requesting other nodes to promise to no longer accept a fast write operation initiated by a leader node whose leader number is less than the first decree number, the first decree number representing a leader number of a current node, and the leader number representing a number of a decree at which the current node that becomes a leader node is located; and in response to receiving decree promises from at least a preset quantity of nodes among the other nodes, enabling the fast write operation from a subsequent decree number of a second decree number determined based on the decree promises, each of the decree promises including the first decree number.

According to an aspect of an example embodiment of the disclosure, a distributed processing method based on a consistency protocol is provided, the method including: extracting, in response to a received decree prepare request, a first decree number from the decree prepare request, the decree prepare request being used for representing that a transmission node of the decree prepare request requests other nodes to promise to no longer accept a fast write operation initiated by a leader node whose leader number is less than the first decree number, the first decree number representing a leader number of the transmission node, and the leader number representing a number of a decree at which the transmission node is located in a case that the transmission node becomes a leader node: and comparing the first decree number with a previous leader number stored in a current node, and determining, based on a comparison result, whether to return a decree promise to the transmission node.

According to an aspect of an example embodiment of the disclosure, a distributed processing method based on a consistency protocol is provided, the method including: extracting, in response to a received ballot request including a fast write identifier, a first decree number, a second decree number greater than the first decree number, and a decree value corresponding to the second decree number from the ballot request, the first decree number representing a leader number of a transmission node of the ballot request, and the leader number representing a number of a decree at which the transmission node is located in a case that the transmission node becomes a leader node; and comparing the first decree number with a previous leader number stored in a current node, and determining, based on a comparison result, whether to record the decree value in a decree corresponding to the second decree number.

According to an aspect of an example embodiment of the disclosure, a distributed processing apparatus based on a consistency protocol is provided, the apparatus including: a decree preparation module, configured to transmit a decree prepare request, the decree prepare request carrying a first decree number and being used for representing requesting other nodes to promise to no longer accept a fast write operation initiated by a leader node whose leader number is less than the first decree number, the first decree number representing a leader number of a current node, and the leader number representing a number of a decree at which the current node is located in a case that the current node becomes a leader node; and a promise processing module, configured to enable, after decree promises are received from at least a preset quantity of nodes in the other nodes, the fast write operation from a subsequent decree number of a second decree number determined based on the decree promises, the decree promise carrying the first decree number.

According to an aspect of an example embodiment of the disclosure, a distributed processing apparatus based on a consistency protocol is provided, the method including: a decree processing module, configured to extract, in response to a received decree prepare request, a first decree number from the decree prepare request, the decree prepare request being used for representing that a transmission node of the decree prepare request requests other nodes to promise to no longer accept a fast write operation initiated by a leader node whose leader number is less than the first decree number, the first decree number representing a leader number of the transmission node, and the leader number representing a number of a decree at which the transmission node is located in a case that the transmission node becomes a leader node; and a decree promise module, configured to: compare the first decree number with a previous leader number stored in a current node, and determine, based on a comparison result, whether to return a decree promise to the transmission node.

According to an aspect of an example embodiment of the disclosure, a distributed processing apparatus based on a consistency protocol is provided, and includes: a ballot processing module, configured to extract, in response to a received ballot request including a fast write identifier, a first decree number, a second decree number greater than the first decree number, and a decree value corresponding to the second decree number from the ballot request, the first decree number representing a leader number of a transmission node of the ballot request, and the leader number representing a number of a decree at which the transmission node is located in a case that the transmission node becomes a leader node; and a compare-write module, configured to: compare the first decree number with a previous leader number stored in a current node, and determine, based on a comparison result, whether to record the decree value in a decree corresponding to the second decree number.

According to an aspect of an example embodiment of the disclosure, a non-transitory computer-readable storage medium is provided. The computer-readable storage medium stores a computer program, the computer program, when executed by a processor, implementing the distributed processing method based on a consistency protocol described above.

According to an aspect of an example embodiment of the disclosure, an electronic device is provided, and includes a processor and a memory, the memory storing computer-readable instructions, and the computer readable instructions, when executed by the processor, implementing the distributed processing method based on a consistency protocol described above.

BRIEF DESCRIPTION OF THE DRAWINGS

The accompanying drawings, which are incorporated herein and constitute a part of this specification, illustrate embodiments consistent with the disclosure and, together with the specification, serve to explain example embodiments of the disclosure.

FIG. 2 is a schematic structural diagram of a computer system suitable for implementing an electronic device according to an embodiment of the disclosure.

FIG. 3 is a flowchart of a distributed processing method based on a consistency protocol according to an embodiment of the disclosure.

DETAILED DESCRIPTION

Figure 1:
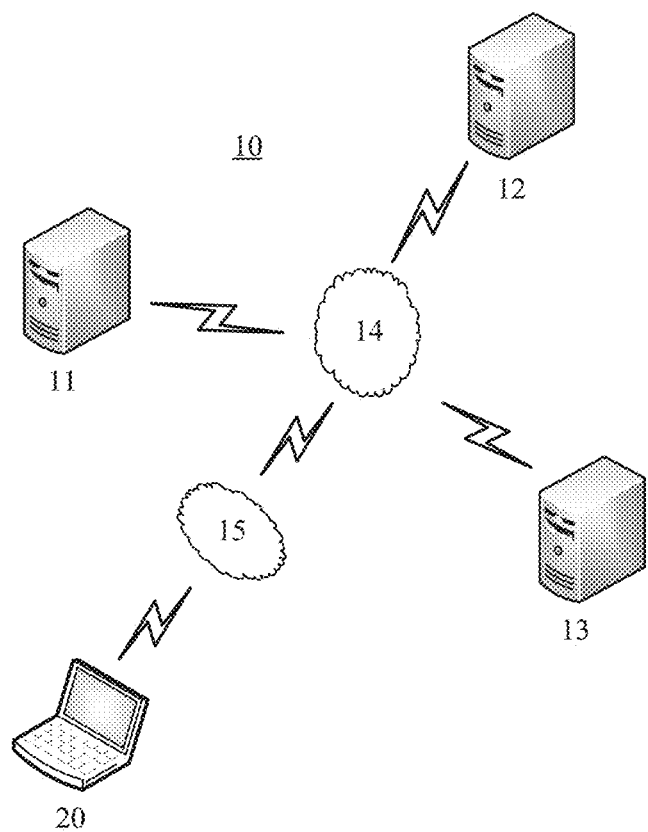
FIG. 1 is a schematic diagram of an example system architecture to which a distributed processing method and/or apparatus based on a consistency protocol according to an embodiment of the disclosure may be applied.

Example implementations are now described more comprehensively with reference to the accompanying drawings. However, the example implementations may be implemented in a plurality of forms, and are not limited to the examples described herein. On the contrary, such implementations are provided to make the disclosure more comprehensive and complete, and fully convey the concepts of the example implementations to a person skilled in the art.

In addition, described features, structures or properties may be combined in one or more embodiments in any suitable manner. In the following description, many specific details are provided to give a full understanding of the embodiments of the disclosure. However, a person skilled in the art should understand that the technical solutions of the disclosure may be practiced without one or more of the specific details, or other methods, components, apparatuses, steps and the like may be adopted. In other cases, known methods, apparatuses, implementations, or operations are not shown or described in detail to avoid blurring aspects of the disclosure.

Block diagrams shown in the accompanying drawings are only functional entities and do not necessarily correspond to physically independent entities. That is, these functional entities may be implemented in a form of software, or in one or more hardware modules or integrated circuits, or in different networks and/or processor apparatuses and/or microcontroller apparatuses.

A flowchart shown in the accompanying drawings is merely an example description, and does not necessarily include all contents and operations/steps, nor is it be necessarily executed in the order described. For example, some operations/steps may be decomposed, while some operations/steps may be combined or partially combined. Therefore, an actual execution order may change according to the actual situation.

Some related technical solutions, principles, and terms are described below before the technical solutions of the embodiments of the disclosure are described in detail.

Paxos

As one of the most important consistency algorithms in the last several decades, Paxos provides extremely high fault tolerance and proper overheads for a distributed processing system. A standard Paxos process requires up to five steps of communication, including a stage 1 (prepare and promise), a stage 2 (vote and response). In order to help clear understanding of the Paxos process, the following commonly used terms in Paxos are described.

Decree value: The decree value refers to information that need to be synchronized between server nodes. In a distributed system, a decree value may be a data value, a command, an original buffer, or the like.

Decree number: The decree number is also referred to as a decree ID, and is a number continuously increased for each decree. A unique decree value is to be passed for a single decree ID. If a plurality of decree values attempt to be passed for a same decree ID, only one value is to be finally selected.

Because of consistency of the distributed processing system, decree numbers may be considered as completely aligned among nodes in the system. For example, referring to the following FIG. 12, for nodes N1 to N3, for a same decree number, the three nodes may be expected to perform a same operation based on a same decree value.

Legislator: The legislator is also referred to as a pastor, and is a server node that may vote for a decree.

Proposer: If a node plays a role of a proposer, when receiving a client request, the node starts a Paxos instance and proposes to pass the instance.

Ballot number: In a Paxos instance, there may be a plurality of rounds, and a unique vote number is used in each round.

Cheap round: The stage 1 may be skipped in some rounds, the stage 2 is directly entered and a "ballot" begins, and a corresponding ballot number is 0, where "cheap" refers to a smaller delay and fewer communication steps.

The standard Paxos process includes the following five steps:

First: Prepare Step

A proposer obtains a client request to perform some operations. To ensure that all copies perform the same work, a proposer node starts a Paxos instance. Therefore, the proposer selects a new decree number d and a new ballot number b, where b needs to be different from any other ballot numbers in this decree.

Subsequently, the proposer broadcasts a prepare request including the decree number d and the ballot number b. For example, the prepare request may be described as Prepare (d, b).

Second: Promise Step

Once receiving a prepare request, a current node determines a largest local ballot number bn, and check a local state of the decree d. According to a determining result and a check result, there may be the following three cases for the subsequent processing:

In a first case, $bn<b$, and no decree value is voted for in a previous ballot. The current node returns a promise message. For example, the promise message may be described as Promise (d, b, lastvote(−1, null)). In addition, the local bn is updated to b.

In a second case, $bn<b$, and the current node voted for a decree value Vm in a previous ballot bm. In this case, the promise message may be described, for example as Promise (d, b, lastvote(bm, Vm)). In addition, a promise of voting for b is recorded locally.

In a third case, $bn \geq b$, and the current node does not perform any action, which is equivalent to discarding the current prepare request.

Finally, the node collects statistics on returned promise messages, and when a quantity of nodes returning a promise message reaches a quorum, it indicates that the current preparation succeeds.

Third: Ballot Step

A node successfully making a preparation by using the ballot number b may transmit a begin ballot request to attempt to pass a decree. In Paxos, a ballot number in each round is required to be unique in a current decree. Generally, the ballot number may be uniquely generated based on a node ID. For example, if a total quantity of nodes is A, a ballot number set of a node whose node ID is B may be $B+A \times t$, where t is a sequence number of a round, and t=1 to n. For example, in a distributed processing system in which a largest node is 3:

a ballot number set of a node 1 is: 1, 4, 7, . . . , $1+3\times(t)$, a ballot number set of a node 2 is: 2, 5, 8, . . . , 2+3×(t), and a ballot number set of a node 3 is: 3, 6, 9, . . . , 3+3×(t), where t is a quantity of times for which a proposer attempts to prepare in a Paxos instance.

The ballot request may be described, for example, as: Ballot (d, vote(b, V)), where the decree value V is selected according to the following rule: If most nodes are in the first case described above, V may be any value; otherwise, V needs to be a lastvote (bm, Vm) in which the ballot number bm is the largest and that is selected from a quorum of nodes making a promise.

Fourth: Vote Step

If a node receives a ballot message, and determines that the ballot number b thereof is greater than or equal to a largest ballot number this time, the node may accept the ballot request, and responds by using, for example, a vote message of Voted (d, b).

Similar to the second step, once the proposer collects a quorum of votes based on the ballot number b, it means that the value is finally selected.

Fifth: Commit Step

If it is found that V is selected, the proposer may transmit, for example, an operation message of Commit (d, b) to notify other nodes.

It can be learned from the foregoing descriptions that performing a successful ballot by using a standard Paxos process causes relative large time and network overheads. Therefore, a fast write mechanism is developed based on Paxos in the related art. All client requests are redirected to a leader, and when the leader is stable, the stage 1 including preparation and a promise needs to be performed only once, and subsequently the stage 2 may be directly entered to initiate a ballot, thereby reducing time and network overheads. However, if the leader is faulty, the entire system cannot be used, and a new leader may be reselected only until a lease expires (e.g., 10 seconds).

To solve the foregoing problem, the embodiments of the disclosure provide a distributed processing method and apparatus based on a consistency protocol, a computer-readable storage medium, and an electronic device. The example embodiments based on the principle of the technical solutions of the disclosure are described below in detail.

FIG. 1 is a schematic diagram of an example system architecture to which a distributed processing method or apparatus based on a consistency protocol according to an embodiment of the disclosure may be applied. As shown in FIG. 1, a distributed processing system 10 includes servers 11 to 13 connected to each other by using a network 14. The three servers maintain consistency of operations and data based on the processing method provided in an embodiment of the disclosure. In addition, FIG. 1 further shows a client device 20 connected to the distributed processing system 10 by using a network 15. Similar to the network 14, the network 15 may also use any communication medium and protocol, and may allow the client device 20 to communicate with one or more servers in the distributed processing system 10. The example in FIG. 1 shows only three servers. Actually, a plurality of servers may exist in the system. In some embodiments, a quantity of servers in the system may be an odd number, for example, 2×N+1, to help reach majority consistency.

Methods in the embodiments may be performed by a network node device, for example, a server in the distributed processing system.

In an embodiment, for example, when receiving a data write request from the client device 20, the server 11 may determine whether the server 11 currently meets preset fast write conditions, the preset conditions including whether the server 11 have become a leader node and have obtained decree promises of at least a preset quantity of nodes. If both the conditions mentioned above are met, a ballot of a fast write operation may be directly initiated. If the conditions mentioned above are not met, a write operation is initiated based on a complete process of an original protocol. In addition, if the server 11 has not become a leader node, but determines, based on processing load of the server 11 (for example, according to a case in which access traffic within a unit time exceeds a threshold), that there is a need to initiate a fast write operation, election information for a leader node is added to decree contents in the ballot part in the foregoing complete process. If the server 11 wins the ballot, the server 11 becomes the leader node, and may make a decree preparation and decree promise before the fast write operation based on the distributed processing method in an embodiment of the disclosure.

In an embodiment, after being elected as a leader node, the server 11 may transmit a decree prepare request, the decree prepare request including a first decree number and being used for requesting other nodes to promise to no longer accept a fast write operation initiated by a leader node whose leader number is less than the first decree number, and the first decree number representing a leader number of a current node. In this specification, a leader number of any node is also referred to as a leader-take-office number or a leader decree number (leader win ID, Lwin_ID), representing a number of a decree at which the node is located when the node becomes a leader node. When it is determined that decree promises are received from at least a preset quantity of nodes in the other nodes, the server 11 may enable the fast write operation from a subsequent decree number of a second decree number determined based on the decree promises, the decree promise including the first decree number. Subsequently, from a subsequent decree number of the second decree number and when receiving a client request, the server 11 may directly transmit a ballot request, the ballot request including a fast write identifier, the first decree number, a third decree number greater than the second decree number, and a decree value corresponding to the third decree number, and being used for requesting the other nodes to record the decree value in a decree corresponding to the third decree number.

In an embodiment, for example, when receiving a decree prepare request transmitted by a leader node (which is, for example, the server 11), the server 12 extracts the first decree number from the decree prepare request, compares the first decree number with a locally stored previous leader number, and determined, based on a comparison result, whether to return a decree promise to the server 11. For example, when the first decree number is less than the previous leader number, the decree prepare request is discarded; and when the first decree number is greater than or equal to the previous leader number, the decree promise is returned to the server 11, the decree promise carrying the first decree number and representing making a promise to the server 11 to enable a fast write operation from a subsequent decree number of the second decree number determined based on the decree promise, or representing no longer accepting a fast write operation initiated by a leader node whose leader number is less than the first decree number.

In an embodiment, for example, when receiving a ballot request including a fast write identifier that is transmitted by a leader node (which is, for example, the server 11), the server 13 extracts a first decree number, a second decree number greater than the first decree number, and a decree value corresponding to the second decree number from the ballot request, compares the first decree number with a locally stored previous leader number, and determines, based on a comparison result, whether to record the decree value in a decree corresponding to the second decree number. For example, when the first decree number is less than the previous leader number, the ballot request is discarded; and when the first decree number is greater than or equal to the previous leader number, a vote is returned to the leader node, and vote information is recorded in the decree corresponding to the second decree number, the vote carrying the second decree number and the fast write identifier, and the vote information including the first decree number, the decree value, and the fast write identifier.

In the foregoing embodiment, the server 11 is described as a proposer node and is successfully elected as a leader node, and the server 12 and the server 13 are described as legislator nodes. However, this is an example brief description. A person skilled in the art is to understand that the distributed processing system 10 may include more servers, and node identities of the servers may be switched according to a time or an application scenario. For example, when elected as a leader node, the server 12 may initiate a decree prepare request. In this case, the server 11 and the server 13 may be used as legislator nodes receiving the request and determining whether to make a promise. This concept are to be applicable throughout the entire specification.

A person skilled in the art is to understand that an embodiment of the disclosure may be applied to any or all distributed computing environments, and may not be limited by the example distributed processing system in FIG. 1 in any manner.

FIG. 2 is a schematic structural diagram of a computer system suitable for implementing an electronic device according to an embodiment of the disclosure.

A computer system 200 of the electronic device shown in FIG. 2 is only an example, and does not impose any limitation on functions and scopes of use of the embodiments of the disclosure.

As shown in FIG. 2, the computer system 200 includes a central processing unit (CPU) 201. The CPU 201 may perform various proper actions and processing based on a program stored in a read-only memory (ROM) 202 or a program loaded from a storage part 208 into a random access memory (RAM) 203. The RAM 203 also stores various programs and data required to operate the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, and the like; an output part 207 including a cathode ray tube (CRT), a liquid crystal display (LCD), a speaker, and the like; a storage part 208 including a hard disk, and the like; and a communication part 209 including a network interface card such as a LAN card, a modem, or the like. The communication part 209 performs communication processing through a network such as the Internet. A drive 210 is also connected to the I/O interface 205 as required. A removable medium 211, such as a magnetic disk, an optical disk, a magneto-optical disk, a semiconductor memory is installed on the drive 210 as required, so that a computer program read therefrom is installed into the storage part 208 as required.

Particularly, according to an embodiment of the disclosure, the processes described in the following with reference to the flowcharts may be implemented as computer software programs. For example, an embodiment of the disclosure includes a computer program product, the computer program product includes a computer program carried on a computer-readable medium, and the computer program includes program code used for performing the methods shown in the flowcharts. In such an embodiment, by using the communication part 209, the computer program may be downloaded and installed from a network, and/or installed from the removable medium 211. When the computer program is executed by the central processing unit (CPU) 201, the various functions defined in the system of the disclosure are executed.

The computer-readable medium shown in the disclosure may be a computer-readable signal medium or a computer-readable storage medium or any combination of the two. The computer-readable storage medium may be, for example, but not limited to, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a RAM, a ROM, an erasable programmable ROM (EPROM or a flash memory), an optical fiber, a portable compact disc ROM (CD-ROM), an optical storage device, a magnetic storage device, or any suitable combination thereof. In the disclosure, the computer-readable storage medium may be any tangible medium containing or storing a program, and the program may be used by or used in combination with an instruction execution system, an apparatus, or a device. In the disclosure, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may further be any computer-readable medium in addition to a computer-readable storage medium. The computer-readable medium may send, propagate, or transmit a program that is used by or used in conjunction with an instruction execution system, an apparatus, or a device. The program code contained in the computer-readable medium may be transmitted by using any appropriate medium, including but not limited to: a wireless medium, a wire, an optical cable, radio frequency (RF), any suitable combination thereof, or the like.

The flowcharts and block diagrams in the accompanying drawings show architectures, functions, and operations that may be implemented for the system, the method, and the computer program product according to the embodiments of the disclosure. In this regard, each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be basically executed in parallel, and sometimes the two boxes may be executed in a reverse sequence. This is determined by a related function. Each box in a block diagram or a flowchart and a combination of boxes in the block diagram or the flowchart may be implemented by using a dedicated hardware-based system configured to perform a specified function or operation, or may be implemented by using a combination of dedicated hardware and a computer instruction.

A related unit described in the embodiments of the disclosure may be implemented in a software manner, or may be implemented in a hardware manner, and the described unit may also be set in a processor. Names of these units do not constitute a limitation on the units in a case.

According to another aspect, the disclosure further provides a computer-readable medium. The computer-readable medium may be included in the electronic device described in the foregoing embodiments, or may exist alone and is not disposed in the electronic device. The computer-readable medium includes one or more programs, the one or more programs, when executed by the electronic device, causing the electronic device to implement the method described in the following embodiment. For example, the electronic device may implement operations shown in FIG. 3 to FIG. 6.

FIG. 3 is a flowchart of a distributed processing method based on a consistency protocol according to an example embodiment. As shown in FIG. 3, the method may be performed by any computing device in a distributed processing system, and may include operation 310 and operation 320.

Operation 310: Transmit a decree prepare request, the decree prepare request carrying a first decree number and being used for requesting other nodes to promise to no longer accept a fast write operation initiated by a leader node whose leader number is less than the first decree number.

Operation 320: Enable, after decree promises are received from at least a preset quantity of nodes in the other nodes, the fast write operation from a subsequent decree number of a second decree number determined based on the decree promises, the decree promise carrying the first decree number.

Different from the related art in which a lease mechanism is used to control existence of only a unique leader node in one time period, an embodiment of the disclosure is based on the following concept: a proper decree promise mechanism is introduced, so that any node having a need may apply at any time to be elected as a leader node, and further determine an opportunity of a fast write operation by initiating a decree preparation and obtaining a decree promise. The fast write operation herein may be understood as corresponding to the foregoing cheap round of Paxos. In other words, enabling a fast write operation means that the leader node may skip the stage 1 of Paxos, and directly perform steps of vote, response, and commit of a particular decree.

In some embodiments, the decree promise received by a current node may include the first decree number and a previous decree number, the previous decree number being used for representing that a node transmitting the decree promise has voted for: performing a write operation in a decree corresponding to the previous decree number. The current node may determine the second decree number from the previous decree numbers in all the decree promises.

In some embodiments, the decree promise received by the current node may further include a previous leader number and is used for representing that a node transmitting the decree promise has voted for a case in which a node corresponding to the previous leader number performs a fast write operation. The current node may find a first leader number from the received decree promises, the first leader number is a largest value in the previous leader numbers or a value appearing most frequently in the decree promises;
and determine the second decree number from first previous decree numbers corresponding to the first leader number.

In various embodiments, a method for determining the second decree number from the received previous decree numbers or the first previous decree numbers corresponding to the first leader number may include the following manners.

Manner 1: The current node may determine, in a case that an $(N+1)^{th}$ previous decree number or the first previous decree numbers are received, that a largest value in the previous decree numbers or the first previous decree numbers in received N+1 decree promises is the second decree number, where N+1 is the preset quantity, and the preset quantity represents a majority of all the nodes. When a plurality of decree promises for which most votes may be obtained and that may be determined are received, the current node directly determines a largest value of previous decree numbers for which most of votes may be obtained, and determines to enable a fast write function from a subsequent decree number of the largest value.

For example, when N+1 decree promises including previous decree numbers are received, the current node may directly use a largest value in the previous decree numbers as an estimated largest previous decree number for which most votes may be obtained, that is, the second decree number. For example, there are 2×N+1 nodes in total, and when N+1 decree promises carrying previous decree numbers are received, a largest value in the previous decree numbers in the N+1 decree promises is used as the second decree number. Because even if an $(N+2)^{th}$ decree promise is further received, and a value of a previous decree number thereof is greater than a largest value of previous decree numbers in the first N+1 decree promises, for the value of the previous decree number in the $(N+2)^{th}$ decree promise, it is impossible to obtain more than N+1 decree promises, that is, majority consistency cannot be reached.

In another example, when N+1 decree promises including the first leader number and previous decree numbers are received, the current node may directly use a largest value in the previous decree numbers corresponding to the first leader number in the decree promises as an estimated largest previous decree number of the first leader number for which most votes may be obtained, that is, the second decree number. For example, when a received $(N+g+1)^{th}$ decree promise is a received $(N+1)^{th}$ decree promise including the first leader number and a previous decree number, the current node may directly use a largest value in previous decree numbers corresponding to the first leader number as an estimated largest previous decree number of the first leader number for which most votes may be obtained, that is, the second decree number. For example, there are 2×N+1 nodes in total, and when N+g+1 decree promises carrying previous leader numbers and previous decree numbers are received, and an $(N+g+1)^{th}$ decree promise is a received $(N+1)^{th}$ decree promise including the first leader number, a largest value in the previous decree numbers corresponding to the first leader number, that is, a largest value in the previous decree numbers in the N+1 decree promises including the first leader number is used as the second decree number. Because even if an $(N+g+2)^{th}$ decree promise is further received, and a previous leader number thereof is not the first leader number, or a value of a previous decree number thereof is greater than a largest value of previous decree numbers corresponding to the first leader number that is determined by using the foregoing method, for any previous decree number corresponding to the previous leader number in the $(N+g+2)^{th}$ decree promise or values of the previous decree numbers corresponding to the first leader number, it is impossible to obtain more than N+1 decree promises, that is, majority consistency cannot be reached.

In the foregoing manner 1, to determine the second decree number, the current node only needs to receive a sufficient quantity of decree promises for estimating a largest previous decree number for which most votes may be obtained, which consumes a relatively short time, and may reduce a wait time especially when there is a relatively large network transmission delay, thereby improving processing efficiency.

Manner 2: The current node may determine, in a case that a quantity of decree promises corresponding to received previous decree numbers or first previous decree numbers is greater than the preset quantity, that a largest value of decree numbers that corresponds to an estimated quantity of votes not less than the preset quantity and that is in the received previous decree numbers or first previous decree numbers is a second previous decree number (or the second decree number), where the preset quantity represents a majority of all the nodes. When receiving a relatively large quantity of decree promises, the current node may remove previous decree numbers for which it is impossible to obtain most votes from the received decree promises, so as to determine a largest value of decree numbers for which an estimated quantity of votes is not less than the preset quantity, and determine to enable a fast write function from a subsequent decree number of the largest value. For example, in received decree promises whose quantity is greater than the preset quantity, there are N+1 previous decree number less than or equal to 190, and there are h (h is less than N+1) previous decree numbers greater than 190. Although values of the previous decree numbers greater than 190 are relatively large, it is impossible to obtain more than N+1 votes for the previous decree numbers. Therefore, the previous decree numbers may be removed. In this way, the current node may begin to enable a fast write function as early as possible, thereby reducing a wait time for data processing, and improving processing efficiency.

In some embodiments, in manner 2, when determining a second previous decree number, the current node may rank the received previous decree numbers or the first previous decree numbers corresponding to the first leader number according to values, and determine that a previous decree number ranked $(N+1)^{th}$ in ascending order is the second previous decree number, where N+1 is the preset quantity.

For example, there are 2×N+1 nodes in total, and when receiving P (P is greater than N+1) decree promises including previous decree numbers, the current node may rank the previous decree numbers in the P decree promises according to values, and determine that a previous decree number ranked $(N+1)^{th}$ in ascending order is the second previous decree number.

In another example, there are 2×N+1 nodes in total, and when receiving P (P is greater than N+1) decree promises including the first leader number and previous decree numbers, the current node may rank the previous decree numbers corresponding to the first leader number in the decree promises according to values, and determine that a previous decree number ranked $(N+1)^{th}$ in ascending order is the second previous decree number.

In the foregoing manner 2, when receiving a relatively large quantity of decree promises, the current node may remove some previous decree numbers for which it is impossible to obtain most votes, so that the current node may enable a fast write function as early as possible, and a wait time for data processing may be reduced especially when there is a relatively large network transmission delay, thereby improving processing efficiency.

In an embodiment, for example, when noticing that a request quantity within a time unit from a client exceeds a preset threshold, the current node becomes a leader node through an election, then initiates transmission of a decree prepare request, and attempts to obtain promises from a majority of nodes to obtain decree numbers for which a fast write operation may be begun. The majority of nodes herein refer to, for example, more than half of the nodes.

In an embodiment, formats of the decree prepare request and the decree promise may be set with reference to messages in a prepare-promise stage in a conventional Paxos theory.

Formats of a common Paxos prepare request and promise message may respectively be, for example:

Prepare (d, b) and

Promise (d, b, lastvote(bm, Vm)).

A legislator node promises to not accept a ballot number less than b, and uses lastvote (previous vote) information to make a response, representing that the legislator node voted for Vm based on a ballot number bm in a previous round. Once a proposer node collects promises from most legislator nodes, it represents that the following conditions are met:

H1: Any subsequent preparation or ballot with a ballot number less than b (bn<b) is to be rejected by most nodes.

H2: Any subsequent preparation or ballot with a ballot number less than b (bn<b) does not succeed.

H3: A lastvote with a largest ballot number bm (bm<b) in the majority that have made a promise and a corresponding value Vm may have been selected.

Referring to the foregoing request and promise message, in an embodiment, the decree prepare request in operation 310 and the promise message in operation 320 may be respectively designed as:

Decree Prepare (−1, 1d) and

Decree Promise (−1, 1d, lastvote(1dm, dm)), where −1 may be considered as an identifier of the decree prepare request, to distinguish the decree prepare request from a common prepare request; 1d represents a decree number when the proposer node requests to become a leader node, and is also referred to as a leader number below; and 1dm and dm respectively represent a leader number elected by the legislator node in a previous vote and a corresponding decree number.

Herein, the decree number is used to additionally represent that feasibility of the leader node lies in that each decree number is unique, so that each time a leader node is elected, a corresponding decree number may be used to identify the leader node. For example, a proposer node 1 wins an election and becomes a leader in a decree 128, and a proposer node 2 wins an election and becomes a leader in a decree 1672. In terms of the overall situation, it is easy to learn that the proposer node 1 obtains a leader node identity in decrees 129 to 1672, and the proposer node 2 obtains a leader node identity from a decree 1673, until a new leader node is elected based on a larger decree number.

Therefore, Decree Prepare (−1, 1d) may be used for representing that the proposer node requests other nodes to promise to no longer accept a fast write operation initiated by a leader node whose leader number is less than 1d.

Correspondingly, Decree Promise (−1, 1d, lastvote(1dm, dm)) may be used for representing that the legislator node promises to no longer accept any cheap round initiated by the leader node whose leader number is less than 1d, that is, neither a decree prepare request nor a ballot request from the leader node whose leader number is less than 1d is accepted.

In some embodiments, when receiving decree promises from the preset quantity of nodes, the proposer node may enable a fast write operation starting from a largest decree number dm corresponding to a largest leader number 1dm that is determined based on the decree promises. The "beginning from dm" herein does not include dm. In other words, the "beginning from dm" represents that a ballot for a fast write operation may be initiated only from a decree dm+1. In an embodiment, the preset quantity herein may be, for example, more than half of all the nodes in the entire system.

In some other embodiments, when receiving decree promises from nodes whose quantity is greater than the preset quantity, the proposer node may determine a largest value in previous leader numbers obtaining at least the preset quantity of votes based on the decree promises; and enable the fast write operation from a previous decree number corresponding to the largest value. The "beginning from dm" herein does not include dm. In other words, the "beginning from dm" represents that a ballot for a fast write operation may be initiated only from a decree dm+1. In an embodiment, the preset quantity herein may be, for example, more than half of all the nodes in the entire system. When a quantity of received decree promises is greater than the preset quantity, a largest value of decree numbers for which an estimated quantity of votes is not less than the preset quantity is found from all the received decree promises.

In an embodiment, the legislator node adds previous vote information to the decree promise and returns the decree promise to the proposer node, the previous vote information including a previous leader number and a corresponding previous decree number and being used for representing that the legislator node has voted for a case in which a node corresponding to the previous leader number performs a fast write operation in a decree corresponding to the previous decree number. Although the legislator node returning the previous vote information herein has voted for a fast write request initiated by an old leader node, the fast write request may not succeed in a ballot, and the fast write request may succeed in the ballot only when a majority cast a vote in a fast write ballot round. The corresponding fast write operation may be performed only after the ballot succeeds.

The legislator node adds the previous vote information to the returned decree promise, so that a decree number having been previously voted may still be selected by the current ballot request. For example, in an embodiment, based on decree promises returned by a legislator node, the proposer node finds a largest value 1dm of previous leader numbers from the decree promises, and initiates a ballot for a fast write operation from a previous decree number dm corresponding to the largest value 1dm.

Based on the above, once the proposer node collects decree promises from most legislator nodes, it represents that the following conditions are met:
- DH1: Any subsequent cheap round with a leader number less than 1d (1dn<1d) is to be rejected by most nodes.
- DH2: Any subsequent cheap round with a leader number less than 1d (1dn<1d) does not succeed.
- DH3: In a previous cheap round, a lastvote with a largest leader number 1dm (1dm<1d) and a corresponding decree dm may have been selected.

For a proposer initiating a prepare request in conventional Paxos, after a prepare-promise stage is successfully performed, a ballot stage may be securely (the system having reached consistency) begun.

Similarly, after decree prepare-decree promise is successfully performed, a leader node initiating a decree prepare request in an embodiment of the disclosure may securely begin a cheap round from a decree dm. In an embodiment, the "beginning from dm" herein does not include a degree dm. In other words, the "beginning from dm" represents that a cheap round may be securely begun, that is, a ballot may be initiated for a fast write operation only from a decree (dm+1).

According to the distributed processing solutions based on a consistency protocol provided in the embodiments of the disclosure, a proper decree prepare stage is designed, so that a system may reach consistency on a node decree through which a leader node may securely perform a fast write operation, thereby avoiding a fast write conflict between leader nodes without lease control, and also retaining a concurrent write capability.

Figure 4:
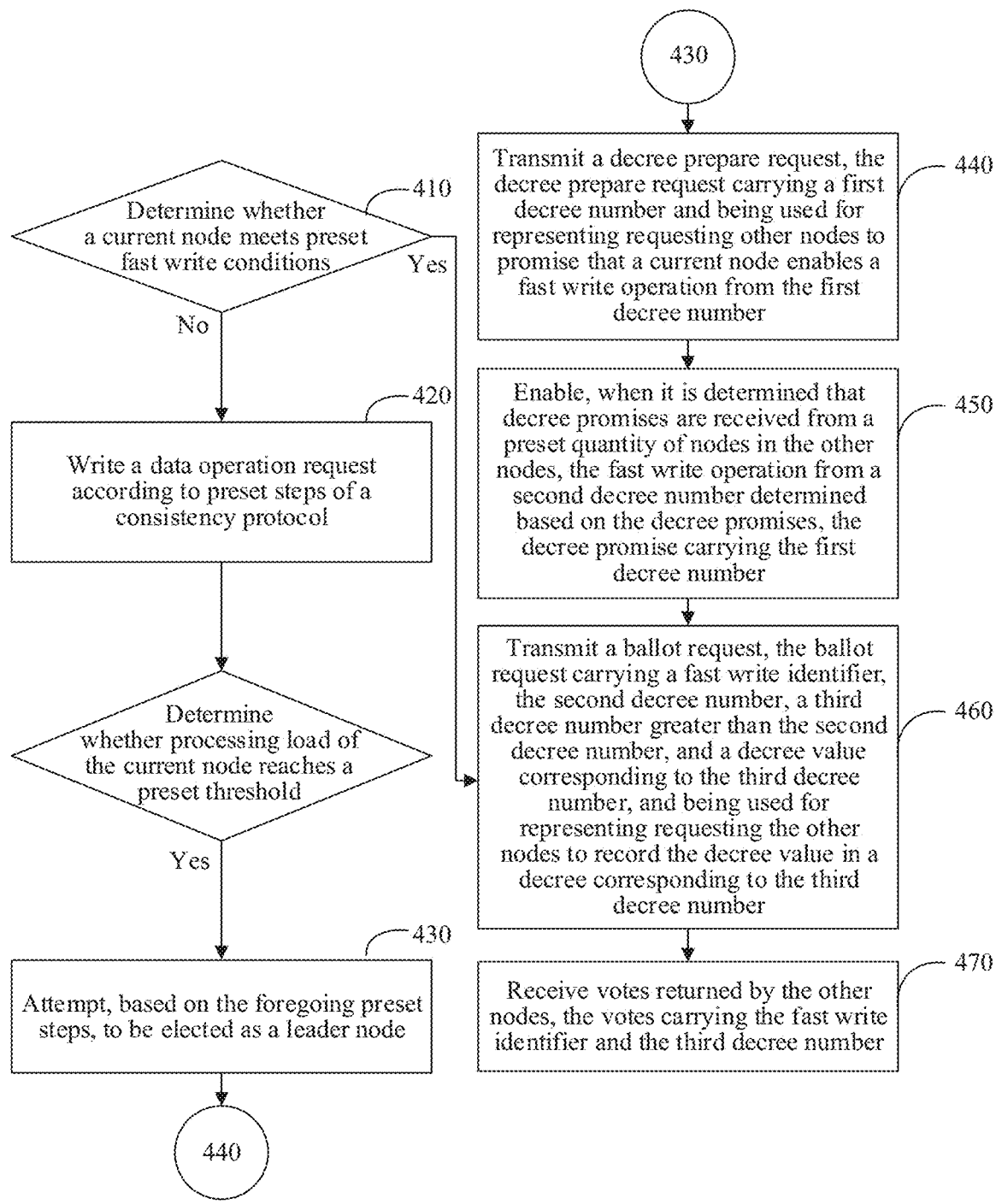
FIG. 4 is a flowchart of a distributed processing method based on a consistency protocol according to an embodiment of the disclosure.

FIG. 4 is a flowchart of a distributed processing method based on a consistency protocol according to another example embodiment. As shown in FIG. 4, the method may be performed by any computing device in a distributed processing system, and may include the following operations 410 to 460.

Operation 410: Determine, in response to a received data operation request, whether a current node meets preset fast write conditions, and if yes, perform operation 460; otherwise, perform operation 420.

In an embodiment, when receiving a data operation request from a client, the current node may first determine whether the current node has already met the conditions of a fast write operation, the conditions including: the current node having become a leader node and having received decree promises transmitted by a preset quantity of nodes through a decree prepare stage.

If it is determined that the foregoing conditions have already been met, the current node may perform operation 460 to begin a ballot stage of a fast write operation; otherwise, the current node performs operation 420 to process the data operation request according to a complete consistency protocol process.

Operation 420: Write the data operation request according to preset operations of the consistency protocol; in addition, a non-leader node determines whether processing load of the current node reaches a preset threshold, and if yes, perform operation 430; otherwise, end the process and process a subsequent data operation request.

In an embodiment, the consistency protocol herein refers to the Paxos protocol described above, and the preset operations are a complete process including the five steps of preparation, promise, ballot, vote, and operation described above.

In addition, based on a determining result of operation 410, the current node has learned whether the current node has become a leader node. If yes, because the conditions of a fast write operation have not been met, it indicates that the current node is attempting to obtain, through a decree preparation, a decree number for which a fast write operation may be performed, or the current node is in a transition period before the decree number. Therefore, a decree number for which a fast write operation may be performed still needs to be waited for.

If the current node learns that the current node is not a leader node based on a determining result of operation 410, the current node may determine whether processing load of the current node reaches a preset threshold, for example, whether a large quantity of data operation requests are received within a unit time, so that the current node may consider that the current node has become a node with largest load in a system. If the load does not reach the preset threshold, the current node may complete writing of the data operation request based on a standard process, and continues to process another data operation request.

In addition, for a non-leader node, if the processing load reaches the preset threshold, the non-leader node may perform operation 430, and attempt, based on the foregoing standard process, to be elected as a leader node.

Operation 430: Attempt, based on the foregoing preset operations, to be elected as a leader node.

In an embodiment, the current node may attempt to become a leader node by writing election information into decree contents of ballot steps in the standard process. When votes transmitted by at least the preset quantity of nodes for the decree are received, it is determined that the current node becomes the leader node.

In the standard Paxos process, formats for a ballot message and a vote message respectively are:

Ballot (d, vote(b, V)) and
Voted (d, b), where d and b are respectively a decree number and a ballot number when a prepare-promise stage is successfully performed, V is decree contents determined based on a preset rule, and for details, reference may be made to the ballot steps described in the foregoing standard Paxos process. Once a proposer collects votes from a majority based on the ballot number b, it means that the decree value V is finally selected.

Therefore, in an embodiment, in addition to writing to-be-written data of the data operation request described above, the current node may further add election information, for example, "I'm the Leader", to the decree contents V of the ballot. In this way, once the current node collects votes from the majority, it means that the decree value V is finally selected. Therefore, when completing writing of the data operation request, the current node becomes a new leader node. In addition, the decree number b corresponding to the selected decree value V may be used as a leader number of the current node.

In addition, according to stipulations of the Paxos protocol, adding any content other than a decree number to the decree contents needs to meet the following condition: that is, a majority of nodes return Promise (d, b, lastvote(−1, null)) in promise messages received in the prepare-promise stage. In other words, the current node may add election information to the decree contents V of the ballot only when it is determined that the majority of nodes in the system did not select other decree contents in a previous ballot.

If the current node is successfully elected as a leader node based on the ballot, the process below may be continued, to enter a decree prepare-decree promise stage; otherwise, the process may be ended to process another data operation request.

Operation 440: Transmit a decree prepare request, the decree prepare request carrying a first decree number and being used for requesting other nodes to promise to no longer accept a fast write operation initiated by a leader node whose leader number is less than the first decree number.

Operation 450: Enable, when it is determined that decree promises are received from a preset quantity of nodes in the other nodes, the fast write operation from a second decree number determined based on the decree promises, the decree promise carrying the first decree number.

For the foregoing operations 440 to 450, reference may be made to descriptions of operations 310 to 320 in the foregoing embodiment in FIG. 3, and details are not described herein.

Operation 460: Transmit a ballot request, the ballot request carrying a fast write identifier, the first decree number, a third decree number greater than the second decree number, and a decree value corresponding to the third decree number, and being used for requesting the other nodes to record the decree value in a decree corresponding to the third decree number.

Operation 470: Receive votes returned by the other nodes, the votes carrying the fast write identifier and the third decree number.

The proposer node may determine, based on the determination from operation 450, that a cheap round, to be specific, initiating a ballot request to attempt to perform a fast write operation, may be securely begun from the second decree number (for example, dm determined in the foregoing embodiment).

In an embodiment, the ballot request carries a fast write identifier, so that the legislator node may distinguish the ballot from a ballot having a common Paxos process.

In an embodiment, the ballot request carries a first decree number used for identifying an identity of a leader node, so that the legislator node may compare the first decree number with a locally stored leader number (being stored based on a previous decree promise or in a vote), to determine whether to transmit a vote to agree to the ballot request.

In an embodiment, the ballot request further carries a third decree number and a corresponding decree value, used for representing that the current leader node requests for a ballot, and attempts to reach consistency on writing the decree value in the decree corresponding to the third decree number. It can be learned from properties of the foregoing leader number that the third decree number herein is greater than the second decree number.

As a response to the ballot request, after comparing the leader number (namely, the first decree number herein) carried in the ballot request with the locally stored leader number, the legislator node determines whether to transmit a vote to agree to the ballot request.

In an embodiment, based on the received ballot request, the other nodes may compare the first decree number with locally stored previous leader numbers thereof. If a preset condition is met (for example, the first decree number is greater than or equal to the previous leader number), a vote may be transmitted, and vote information may be recorded in a decree corresponding to the third decree number, where the vote information may include the first decree number, the decree value, and the fast write identifier. Correspondingly, when subsequently receiving a decree prepare request transmitted by the new leader node, the other nodes may return the vote information recorded herein (reference may be made to the descriptions of operations 310 and 320 in the embodiment in FIG. 3).

In an embodiment, formats of the ballot request and a vote may be set with reference to messages in the ballot-vote stage in the conventional Paxos theory.

As described above in operation 430, formats of a common Paxos ballot and a common Paxos vote message may respectively be, for example:

Ballot (d, vote(b, V)) and
Voted (d, b).

Referring to the foregoing ballot and vote message, in an embodiment, the ballot request in operation 460 and the vote message in operation 470 may be respectively designed as:

Ballot (d, vote(0, V, 1d)) and
Voted (d, 0),
where 0 is the fast write identifier, 1d is a leader number for which a decree request and decree promise stage is successfully performed, and d and V respectively are the decree number and the decree value for which the current ballot request attempts to initiate a fast write operation.

After the decree request and decree promise stage, the legislator node has promised to no longer respond to a cheap round with a leader number less than 1d. Therefore, before receiving a ballot request initiated by a current leader node herein, if the legislator node makes a promise to another proposer node whose leader number is greater than 1d, the legislator node is to reject the fast write operation corresponding to the current ballot request, that is, causes V not to be selected.

In other words, before the leader node initiates a ballot for a cheap round, it has been determined, based on decree promises, that all cheap rounds that are initiated by old leader nodes (whose leader numbers are smaller) are not to succeed (referring to the foregoing condition DH1-3). Therefore, even if two leader nodes (considered as leader nodes by the nodes through promises) initiate ballots for a cheap round successively, based on the decree prepare-promise mechanism designed in an embodiment of the disclosure, it may also be ensured that only the ballot request with the largest leader number succeeds. That is, only the decree value V thereof may be selected. A brief mathematical proof of the mechanism described above is provided below.

Assuming that a leader node x (corresponding to a decree number 1dx) initiates a fast write operation opx in a decree d, and an initiated ballot request is, for example:
Ballot x (d, vote(0, opx, 1dx)); and
a leader node y (corresponding to a decree number 1dy) initiates a fast write operation opy in the decree d, and an initiated ballot request is, for example:
Ballot y (d, vote(0, opy, 1dy)),
it is to be proved that:
if x>y, opy is definitely not selected.
Proof process (proof by contradiction):
assuming that opy is selected in the decree d, a majority of Qys accepting Ballot y definitely exists.
Because x>y, and the leader node 1dx initiates a fast write operation only after the decree promise succeeds,
a majority of Qxs promising to no longer accept any fast write operation with 1d<1dx at a decree promise moment definitely exists, that is, the majority of Qxs do not accept Ballot y.

It can be learned from definition of the majority in the distributed system that an intersection set of Qx and Qy is definitely not empty.

Therefore, it is obtained that, the intersection set between Qx and Qy includes at least one node, which accepts Ballot y and does not accept Ballot y, causing a conflict.

The assumption that opy is selected in the decree d is not true. Therefore, Ballot y definitely does not succeed, and the system may reach consistency on Ballot x.

It can be seen from the foregoing proof that, even if a plurality of proposer nodes are convinced that they become leader nodes through a decree prepare-decree promise stage, a plurality of fast write ballot requests subsequently initiated do not cause inconsistent operations of the system.

In an embodiment, after operation 470, the method further includes: performing an operation of fast writing the decree value in a decree corresponding to the third decree number when it is determined that votes are received from the preset quantity of nodes (for example, the majority of nodes).

According to the distributed processing solutions based on a consistency protocol provided in the embodiments of the disclosure, a proper decree prepare stage is designed, so that a system may reach consistency on a node decree through which a leader node may securely perform a fast write operation, thereby avoiding a fast write conflict between leader nodes without lease control, and also retaining a concurrent write capability.

The nodes in the system may switch between roles in different cases or time, may become leaders by performing the foregoing election process, and enable a fast write function, or may respectively return a decree promise and a vote for a received decree prepare request and a received ballot as a legislator.

In some embodiments, when receiving a decree prepare request transmitted by another node, the current node may also extract, in response to a received second decree prepare request transmitted by a second node, a fourth decree number from the second decree prepare request, the second decree prepare request being used for representing that the second node requests other nodes to promise to no longer accept a fast write operation initiated by a leader node whose leader number is less than the fourth decree number, and the fourth decree number representing a leader number of the second node; and compare the fourth decree number with a second previous leader number stored in the current node, and determine, based on a comparison result, whether to return a second decree promise to the second node.

In some embodiments, when determining, based on the comparison result, whether to return the second decree promise to the second node, the current node may discard the second decree prepare request in a case that the fourth decree number is less than the second previous leader number; and return the second decree promise to the second node in a case that the fourth decree number is greater than or equal to the second previous leader number, the second decree promise carrying the fourth decree number and being used for representing making a promise to no longer accept a fast write operation initiated by a leader node whose leader number is less than the fourth decree number.

In some embodiments, the second decree promise further carries a second previous decree number, the second previous decree number being used for representing that the current node has voted for: performing a write operation in a decree corresponding to the second previous decree number.

In some embodiments, when receiving a ballot request (referred to as a second ballot request herein, to be distinguished from the ballot request transmitted by the current node) transmitted by another node, the current node may also extract, in response to a received second ballot request including a fast write identifier, a fifth decree number, a sixth decree number greater than the fifth decree number, and a decree value corresponding to the sixth decree number from the second ballot request, the fifth decree number representing a leader number of the transmission node of the ballot request, and the leader number representing a number of a decree at which the transmission node is located in a case that the transmission node becomes a leader node; and compare the fifth decree number with a previous leader number stored in the current node, and determine, based on a comparison result, whether to record the decree value in a decree corresponding to the sixth decree number.

In some embodiments, when determining, based on the comparison result, whether to write the decree value in the decree corresponding to the sixth decree number, the current node may discard the second ballot request in a case that the fifth decree number is less than the previous leader number; and return a vote to the transmission node in a case that the fifth decree number is greater than or equal to the previous leader number, and perform the operation of recording vote information in the decree corresponding to the sixth decree number, the vote carrying the sixth decree number and the fast write identifier, and the vote information including the fifth decree number, the decree value, and the fast write identifier.

Figure 5:
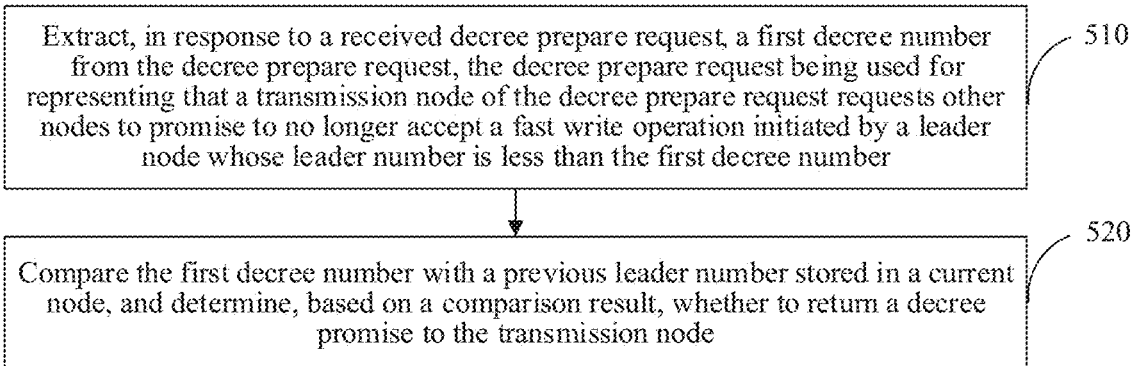
FIG. 5 is a flowchart of a distributed processing method based on a consistency protocol according to an embodiment of the disclosure.

A processing method when a node receives a decree prepare request transmitted by another node is described below, FIG. 5 is a flowchart of a distributed processing method based on a consistency protocol according to still another example embodiment. As shown in FIG. 5, the method may be performed by any computing device in a distributed processing system, and may include the following operation 510 and operation 520.

Operation 510: Extract, in response to a received decree prepare request, a first decree number from the decree prepare request, the decree prepare request being used for representing that a transmission node of the decree prepare request requests other nodes to promise to no longer accept a fast write operation initiated by a leader node whose leader number is less than the first decree number.

Operation 520: Compare the first decree number with a previous leader number stored in a current node, and determine, based on a comparison result, whether to return a decree promise to the transmission node.

The decree prepare-decree promise stage is described from a perspective of a legislator node in a distributed processing system in an embodiment.

In an embodiment, the legislator node may distinguish the decree prepare request from a common Paxos prepare request according to an identifier of the decree prepare request in the request.

When identifying a received decree prepare request transmitted by a proposer node, the legislator node extracts a first decree number for which the proposer node requests to make a promise, and compares the first decree number with a locally stored previous leader number, to determine whether to return a decree promise to the transmission node. The previous leader number herein may be from a decree prepare request or ballot request that is previously received by the legislator node. For example, an initial value of the locally stored previous leader number of the legislator node may be 0, and each time a decree prepare request or ballot request with a leader number greater than a local storage value is received subsequently, a larger value is used to update the locally stored previous leader number.

Subsequently, in an embodiment, when the first decree number is less than the previous leader number, the legislator node discards the decree prepare request; otherwise, when the first decree number is greater than or equal to the previous leader number, the legislator node returns the decree promise to the proposer node, the decree promise carrying the first decree number and being used for representing making a promise to the transmission node to enable a fast write operation from a second decree number determined based on the decree promise. In other words, the decree promise of the legislator node represents not accepting any cheap round with a leader number less than the first decree number subsequently.

In some embodiments, the decree promise further carries a previous decree number used for representing that the current node has voted for: performing a write operation in a decree corresponding to the previous decree number.

In some other embodiments, the decree promise further carries previous vote information, the previous vote information including a previous leader number and a previous decree number, to be used for representing that the current legislator node has voted for a case in which a node corresponding to the previous leader number performs a fast write operation in a decree corresponding to the previous decree number. Although the legislator node returning the previous vote information herein has voted for a fast write request initiated by an old leader node, the fast write request may not succeed in a ballot, and the fast write request may succeed in the ballot only when a majority cast a vote in a fast write ballot round. The corresponding fast write operation may be performed only after the ballot succeeds, By carrying the previous vote information, a decree number having been previously voted may still be selected by the current ballot request.

Referring to the descriptions in the embodiment in FIG. 3, the decree prepare request described in operation 510 and the decree promise message described in operation 520 herein may be respectively designed as follows with reference to the preparation and promise message in a common Paxos process:

Decree Prepare (−1, 1d) and

Decree Promise (−1, 1d, lastvote(1dm, dm)), where −1 may be considered as an identifier of the decree prepare request, to distinguish the decree prepare request from a common prepare request; 1d represents a corresponding decree number when the proposer node is elected as a leader node, and is also referred to as a leader number below; and 1dm and dm respectively represent a leader number elected by the legislator node in a previous vote and a corresponding decree number.

Herein, Decree Prepare (−1, 1d) may be used for representing that the proposer node requests other nodes to promise to no longer accept a fast write operation initiated by a leader node whose leader number is less than 1d.

Correspondingly, Decree Promise (−1, 1d, lastvote(1dm, dm)) may be used for representing that the legislator node promises to no longer accept any cheap round initiated by the leader node whose leader number is less than 1d, that is, neither a decree prepare request nor a ballot request from the leader node whose leader number is less than 1d is accepted.

In this way, when receiving decree promises from the preset quantity of nodes, the proposer node may enable a fast write operation from a largest decree number dm corresponding to a largest leader number Rim that is determined based on the decree promises. The "beginning from dm" herein does not include dm. In other words, the "beginning from dm" represents that a ballot for a fast write operation may only be initiated front a decree dm+1. In an embodiment, the preset quantity herein may be, for example, more than half of all the nodes in the entire system.

In addition, the legislator node herein carries previous vote information lastvote in the decree promise and returns the decree promise to the proposer node, the previous vote information being used for representing that the legislator node has voted for a case in which a node corresponding to the previous leader number performs a fast write operation in a decree corresponding to the previous decree number. Based on decree promises returned by a legislator node, the proposer node finds a largest value 1dm of previous leader numbers from the decree promises, and enables a fast write operation from a previous decree number dm corresponding to the largest value 1dm.

For a proposer initiating a prepare request in conventional Paxos, after a prepare-promise stage is successfully performed, a ballot stage may be securely (the system having reached consistency) begun.

Similarly, after decree prepare-decree promise is successfully performed, a proposer initiating a decree prepare request in an embodiment of the disclosure may securely begin a cheap round from a decree dm. In an embodiment, the "beginning from dm" herein does not include dm. In other words, the "beginning from dm" represents that a cheap round, that is, enabling a fast write operation, may only be securely begun from a decree (dm+1).

According to the distributed processing solutions based on a consistency protocol provided in the embodiments of the disclosure, a proper decree prepare stage is designed, so that a system may reach consistency on a node decree through which a leader node may securely perform a fast write operation, thereby avoiding a fast write conflict between leader nodes without lease control, and also retaining a concurrent write capability.

Figure 6:
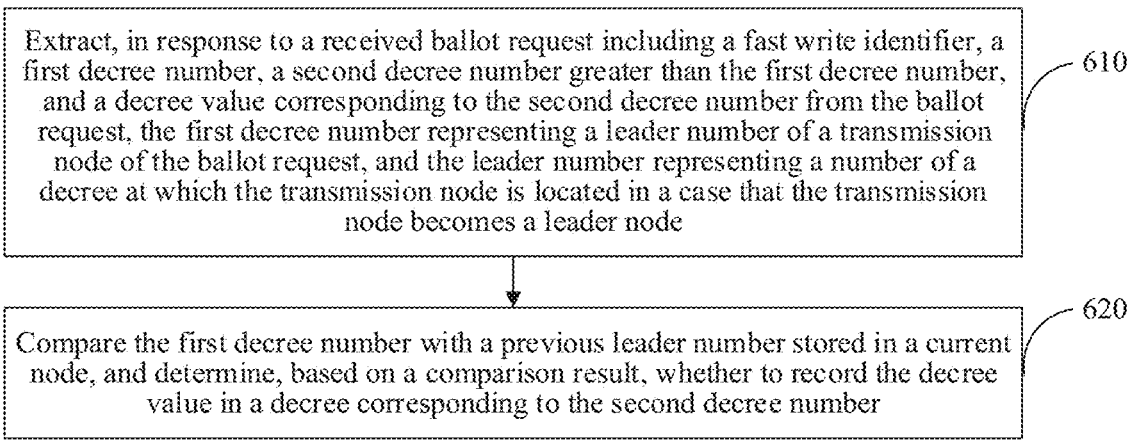
FIG. 6 is a flowchart of a distributed processing method based on a consistency protocol according to an embodiment of the disclosure.

A processing method when a node receives a ballot request transmitted by another node is described below. FIG. 6 is a flowchart of a distributed processing method based on a consistency protocol according to still another example embodiment. As shown in FIG. 6, the method may be performed by any computing device in a distributed processing system, and may include the following operation 610 and operation 620.

Operation 610: Extract, in response to a received ballot request including a fast write identifier, a first decree number, a second decree number greater than the first decree number, and a decree value corresponding to the second decree number from the ballot request, the first decree number representing a leader number of a transmission node of the ballot request, and the leader number representing a number of a decree at which the transmission node is located in a case that the transmission node becomes a leader node.

Operation 620: Compare the first decree number with a previous leader number stored in a current node, and determine, based on a comparison result, whether to record the decree value in a decree corresponding to the second decree number.

The cheap round stage is described from a perspective of a legislator node in a distributed processing system in an embodiment, including the ballot request and vote returning.

In an embodiment, the legislator node may distinguish the ballot request from a common Paxos ballot request according to the fast write identifier in the request.

In an embodiment, the ballot request carries a first decree number used for identifying an identity of a leader node, so that the legislator node may compare the first decree number with a locally stored leader number (being stored based on a previous decree promise or in a vote), to determine whether to transmit a vote to agree to the ballot request.

In an embodiment, the ballot request further carries a second decree number and a corresponding decree value, used for representing that the current leader node requests for a ballot, and attempts to reach consistency on writing the decree value in a decree corresponding to the second decree number. It can be learned from properties of the foregoing leader number that the second decree number herein is greater than the first decree number.

Subsequently, in an embodiment, when the first decree number is less than the previous leader number, the ballot request is discarded. Conversely, when the first decree number is greater than or equal to the previous leader number, a vote is returned to the transmission node, and an operation of recording vote information in the decree corresponding to the second decree number is performed, the vote carrying the second decree number and the fast write identifier, and the vote information including the first decree number, the decree value, and the fast write identifier.

As a response to the ballot request, after comparing the leader number (namely, the first decree number herein) carried in the ballot request with the locally stored leader number, the legislator node determines whether to transmit a vote to agree to the ballot request.

In an embodiment, the ballot request described in operation 610 and the vote message described in operation 620 may be set with reference to messages in the ballot-vote stage in the conventional Paxos theory, for example, being respectively set to:

Ballot (d, vote(0, V, 1d)) and
Voted (d, 0),
where 0 is the fast write identifier, 1d is a leader number for which a decree request and decree promise stage is successfully performed, and d and V respectively are the decree number and the decree value for which the current ballot request attempts to initiate a fast write operation.

After the decree request and decree promise stage, the legislator node has promised to no longer respond to a cheap round with a leader number less than 1d, Therefore, before receiving a ballot request initiated by a current leader node herein, if the legislator node makes a promise to another proposer node whose leader number is greater than 1d again, the legislator node is to reject the fast write operation corresponding to the current ballot request, that is, causing V not to be selected.

In other words, before the leader node initiates a ballot for a cheap round, it has been determined, based on decree promises, that all cheap rounds that are initiated by old leader nodes (whose leader numbers are smaller) are not to succeed (referring to the foregoing condition DH1-3). Therefore, even if two leader nodes (considered as leader nodes by the nodes through promises) initiate ballots for a cheap round successively, based on the decree prepare-promise mechanism designed in an embodiment of the disclosure, it can also be ensured that only the ballot request with the largest leader number succeeds. That is, only the decree value V thereof may be selected.

With reference to the mathematical proof in the embodiment in FIG. 4, it can be seen that even if a plurality of proposer nodes are convinced that they become leader nodes through a decree prepare-decree promise stage, a plurality of fast write ballot requests subsequently initiated do not cause inconsistent operations of the system.

According to the distributed processing solutions based on a consistency protocol provided in the embodiments of the disclosure, a proper decree prepare stage is designed, so that a system may reach consistency on a node decree through which a leader node may securely perform a fast write operation, thereby avoiding a fast write conflict between leader nodes without lease control, and also retaining a concurrent write capability.

Apparatus embodiments of the disclosure are described below, and may be used to perform the embodiments of the foregoing distributed processing method based on a consistency protocol of the disclosure. For details not disclosed in the apparatus embodiments of the disclosure, reference may be made to the embodiments of the distributed processing method based on a consistency protocol of the disclosure.

Figure 7:
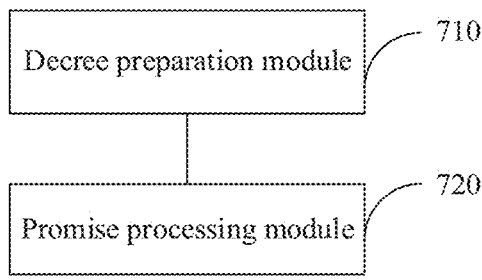
FIG. 7 is a schematic block diagram of a distributed processing apparatus based on a consistency protocol according to an embodiment of the disclosure.

FIG. 7 is a schematic block diagram of a distributed processing apparatus based on a consistency protocol according to an example embodiment. As shown in FIG. 7, the apparatus may be implemented by any computing device in a distributed processing system, and may include a decree preparation module 710 and a promise processing module 720.

In an embodiment, the decree preparation module 710 is configured to transmit a decree prepare request, the decree prepare request carrying a first decree number and being used for requesting other nodes to promise to no longer accept a fast write operation initiated by a leader node whose leader number is less than the first decree number, the first decree number representing a leader number of a current node, and the leader number representing a number of a decree at which the current node is located in a case that the current node becomes a leader node.

In an embodiment, the promise processing module 720 is configured to enable, when it is determined that decree promises are received from at least a preset quantity of nodes in the other nodes, the fast write operation from a second decree number determined based on the decree promises, the decree promise carrying the first decree number.

Subsequently, in an embodiment, the decree promise received by the promise processing module 720 carries the first decree number and previous vote information, the previous vote information including a previous leader number and a previous decree number, and being used for representing that a node transmitting the decree promise has voted for a case in which a node corresponding to the previous leader number performs a fast write operation in a decree corresponding to the previous decree number.

Correspondingly, the promise processing module 720 may find a largest value of the previous leader numbers from the decree promises transmitted by the preset quantity of nodes, and enable the fast write operation from a previous decree number corresponding to the largest value.

Figure 8:
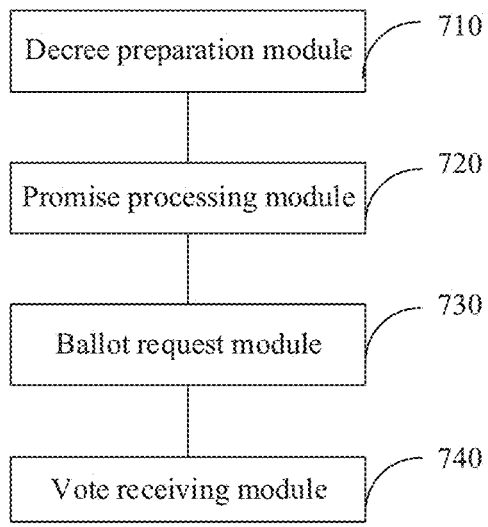
FIG. 8 is a schematic block diagram of a distributed processing apparatus based on a consistency protocol according to an embodiment of the disclosure.

FIG. 8 is a schematic block diagram of a distributed processing apparatus based on a consistency protocol according to another example embodiment. As shown in FIG. 8, the apparatus further includes a ballot request module 730 and a vote receiving module 740 based on the embodiment shown in FIG. 7.

In an embodiment, the ballot request module 730 is configured to transmit a ballot request, the ballot request carrying a fast write identifier, the first decree number, a third decree number greater than the second decree number, and a decree value corresponding to the third decree number, and being used for requesting the other nodes to record the decree value in a decree corresponding to the third decree number. In an embodiment, the fast write identifier herein may be, for example, 0.

In an embodiment, the vote receiving module 740 is configured to receive votes returned by the other nodes, the votes carrying the fast write identifier and the third decree number.

Figure 9:
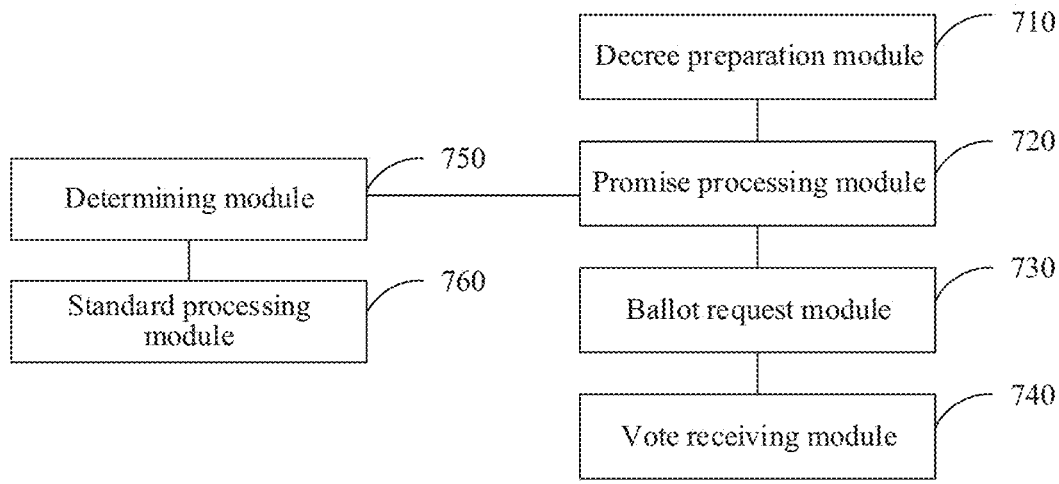
FIG. 9 is a schematic block diagram of a distributed processing apparatus based on a consistency protocol according to an embodiment of the disclosure.

FIG. 9 is a schematic block diagram of a distributed processing apparatus based on a consistency protocol according to still another example embodiment. As shown in FIG. 9, the apparatus further includes a determining module 750 and a standard processing module 760 based on the embodiment shown in FIG. 8.

In an embodiment, the determining module 750 is configured to determine, in response to a received data operation request, whether the current node meets preset conditions, the preset conditions including: having become a leader node and receiving decree promises transmitted by the preset quantity of nodes.

When it is determined that the current node meets the preset conditions, the ballot request module 730 is instructed to transmit a ballot request.

When it is determined that the current node does not meet the preset conditions, the standard processing module 760 is configured to write the data operation request according to preset steps of the consistency protocol.

When it is determined that the current node is not a leader node, the standard processing module 760 is configured to determine, based on processing load of the current node, whether the current node is to be elected as the leader node.

In an embodiment, when it is determined that the current node is to be elected as the leader node, the standard processing module 760 is configured to write election information into a decree value of a ballot request included in the preset steps.

Figure 10:
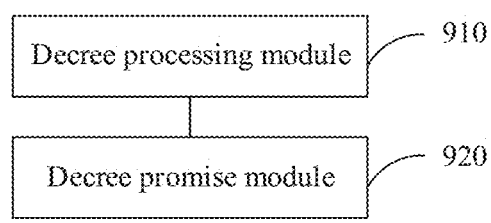
FIG. 10 is a schematic block diagram of a distributed processing apparatus based on a consistency protocol according to an embodiment of the disclosure.

FIG. 10 is a schematic block diagram of a distributed processing apparatus based on a consistency protocol according to still another example embodiment. As shown in FIG. 10, the apparatus may be implemented by any computing device in a distributed processing system, and may include a decree processing module 910 and a decree promise module 920.

In an embodiment, the decree processing module 910 is configured to extract, in response to a received decree prepare request, a first decree number from the decree prepare request, the decree prepare request being used for representing that a transmission node of the decree prepare request requests other nodes to promise to no longer accept a fast write operation initiated by a leader node whose leader number is less than the first decree number, the first decree number representing a leader number of the transmission node, and the leader number representing a number of a decree at which the transmission node is located in a case that the transmission node becomes a leader node.

In an embodiment, the decree promise module 920 is configured to: compare the first decree number with a previous leader number stored in a current node, and determine, based on a comparison result, whether to return a decree promise to the transmission node.

Subsequently, in an embodiment, when the first decree number is less than the previous leader number, the decree promise module 920 discards the decree prepare request; and when the first decree number is greater than or equal to the previous leader number, the decree promise module 920 returns the decree promise to the transmission node, the decree promise carrying the first decree number and being used for representing making a promise to the transmission node to enable a fast write operation from a second decree number determined based on the decree promise.

In an embodiment, the decree promise transmitted by the decree promise module 920 further carries previous vote information, the previous vote information including a previous leader number and a previous decree number, and being used for representing that the current node has voted for a case in which a node corresponding to the previous leader number performs a fast write operation in a decree corresponding to the previous decree number.

Figure 11:
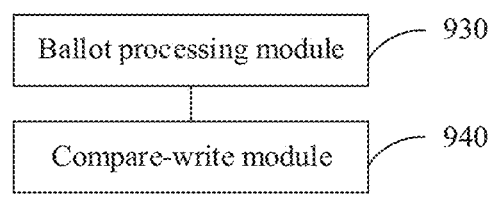
FIG. 11 is a schematic block diagram of a distributed processing apparatus based on a consistency protocol according to an embodiment of the disclosure.

FIG. 11 is a schematic block diagram of a distributed processing apparatus based on a consistency protocol according to still another example embodiment. As shown in FIG. 11, the apparatus may be implemented by any computing device in a distributed processing system, and may include a ballot processing module 930 and a compare-write module 940.

In an embodiment, the ballot processing module 930 is configured to: extract, in response to a received ballot request including a fast write identifier, a first decree number, a second decree number greater than the first decree number, and a decree value corresponding to the second decree number from the ballot request, the first decree number representing a leader number of a transmission node of the ballot request, and the leader number representing a number of a decree at which the transmission node is located in a case that the transmission node becomes a leader node. In an embodiment, the fast write identifier herein may be, for example, 0.

In an embodiment, the compare-write module 940 is configured to: compare the first decree number with a previous leader number stored in a current node, and determine, based on a comparison result, whether to record the decree value in a decree corresponding to the second decree number.

Subsequently, in an embodiment, when the first decree number is less than the previous leader number, the compare-write module 940 discards the ballot request; and when the first decree number is greater than or equal to the previous leader number, the compare-write module 940 returns a vote to the transmission node, and records vote information in a decree corresponding to the second decree number, the vote carrying the second decree number and the fast write identifier, and the vote information including the first decree number, the decree value, and the fast write identifier.

According to the solutions of the distributed processing apparatus based on a consistency protocol provided in the embodiments of the disclosure, a proper decree prepare-decree promise stage is designed, so that a system may reach consistency on a decree through which a leader node may securely perform a fast write operation, thereby avoiding a fast write conflict between leader nodes without lease control, and also retaining a concurrent write capability.

For the apparatus in the foregoing embodiment, a specific manner in which each module performs an operation is already described in detail in the embodiments related to the method, and details are not described herein again.

Although several modules or units of the device configured to perform actions are mentioned in the foregoing detailed description, such division is not mandatory. In practice, according to the implementations of the present disclosure, the features and functions of two or more modules or units described above may be embodied in one module or unit. Conversely, the features or functions of one module or unit described above may further be divided and embodied by a plurality of modules or units. The components shown as modules or units may or may not be physical units, may be located in one position, or may be distributed on a plurality of network units. The objective of the solution of the present disclosure may implemented by selecting some or all of the modules according to actual needs.

Figure 12:
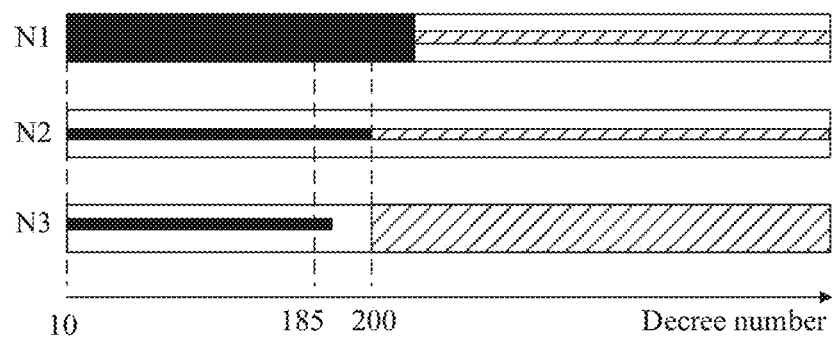
FIG. 12 is a schematic diagram of an application scenario of a distributed processing method or apparatus based on a consistency protocol according to an embodiment of the disclosure.

FIG. 12 is an example of a schematic diagram of an application scenario of a distributed processing method or apparatus based on a consistency protocol according to an embodiment of the disclosure.

As shown in FIG. 12, a distributed processing system includes three nodes N1 to N3. From the operation in step 10, N1 becomes a leader node, and begins continuous concurrent fast write operations, where a leader number may be recorded as 1d=10.

In the operation in step 185, N3 detects that a quantity of requests from clients exceeds a preset threshold, and attempts to be elected as a new leader node based on a complete Paxos protocol; and if the N3 succeeds in the election, 185 may be used as a leader number of N3. Subsequently, N3 transmits a decree prepare request Decree Prepare (−1, 185) through broadcasting, attempting to obtain promises from a majority (being two in FIG. 12).

Subsequently, through comparison with a local previous leader number (10), N2 transmits a decree promise message Decree Promise (−1, 185, lastvote(10, 200)), representing promising to reject a fast write operation of a previous leader node (1d=10) from a subsequent operation of the operation in step 200.

At this point, it represents that N2 and N3 (the majority) may reach consistency on a decree number (200) for which a fast write operation may be securely performed. N3 may continuously enable concurrent fast write operations from the operation in step 201, until a next leader node is elected.

During operations in steps 186 to 200, N3 still performs an operation according to a standard Paxos process.

It can be learned from FIG. 12 that, a fast write operation of N1 (the black part) lasts only to a period of time after step 185 in the node N3. This may be understood as a case in which N3 acquires confirmation successfully after a period of time following an election for a leader node in step 185. In this case, a locally stored leader number has been greater than 10. Therefore, a fast write operation initiated by N1 is no longer accepted. In addition, a fast write operation of N3 (the shaded part) begins after a period of waiting time following operation 200 in the node N1, which may be understood as a case in which a decree prepare request that is previously received from N3 by N1 has a delay.

It can be seen from the scenario shown in FIG. 12 that, based on the decree preparation and promise mechanism of the embodiments of the disclosure, seamless switching of leader nodes may be implemented, thereby avoiding a waste of time caused by an expired lease due to waiting, and the system remains in service during the entire process, and retains a concurrent write capability.

Through descriptions of the foregoing implementations, it is easy for a person skilled in the art to understand that the example implementations described herein may be implemented by software or by combining software with necessary hardware. Therefore, the technical solutions of the implementations of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of the disclosure.

The technical solutions provided in the embodiments of the disclosure may include the following technical effects:

According to the distributed processing solutions based on a consistency protocol provided in the embodiments of the disclosure, a proper decree prepare stage is designed, so that a system may achieve consistency on a node decree through which a leader node may securely perform a fast write operation, thereby avoiding a fast write conflict between leader nodes without lease control, and also retaining a concurrent write capability.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

After considering the specification and practicing the disclosure disclosed herein, a person skilled in the art can easily figure out another implementation solution of the disclosure. The disclosure is intended to cover any variation, use, or adaptive change of the disclosure. Such variations, uses, or adaptive changes follow the general principles of the disclosure and include well-known knowledge or conventional technical means in the art that are not disclosed in the disclosure. The specification and the embodiments are merely considered as example, and the real scope and spirit of the disclosure are pointed out in the following claims.

It is to be understood that the disclosure is not limited to the precise structures described above and shown in the accompanying drawings, and various modifications and changes can be made without departing from the scope of the disclosure. The scope of the disclosure is subject only to the appended claims.

What is claimed is:

1. A distributed processing method based on a consistency protocol, applied to a network node device, the method comprising:

based on receiving a data operation request, determining, by a current node, that the current node has been elected as a leader node and the current node has not received decree promises from at least a preset quantity of nodes, and selecting a first decree number as a new decree number, wherein a decree number is a number that continuously increases for each decree and each decree number is unique;

transmitting, by the current node that has been elected as the leader node, a decree prepare request including the first decree number, the decree prepare request requesting other nodes to make a decree promise to no longer accept a fast write operation initiated by a leader node whose leader number is less than the first decree number, the fast write operation being an operation to directly initiate a ballot for a particular decree while skipping prepare and promise operations for the particular decree, the first decree number representing a leader number of the current node, and the leader number representing a number of a decree at which the current node that becomes a leader node is located; and in response to receiving, from at least the preset quantity of nodes among the other nodes, decree promises including the first decree number, enabling, by the current node, the fast write operation from a subsequent decree number of a second decree number determined based on the decree promises including the first decree number, wherein the second decree number is greater than the first decree number, wherein based on the fast write operation being enabled, the current node initiates a ballot for the subsequent decree number while skipping transmitting a prepare request and obtaining promises for the subsequent decree number.

2. The method according to claim 1, wherein a decree promise includes the first decree number and a previous decree number, the previous decree number indicating that a node transmitting the decree promise has voted for: performing a write operation in a decree corresponding to the previous decree number, the method further comprising determining the second decree number based on previous decree numbers in the decree promises.

3. The method according to claim 2, wherein each of the decree promises further comprises a previous leader number indicating that the node transmitting the decree promise has voted for a node corresponding to the previous leader number to perform the fast write operation, and wherein the determining the second decree number comprises:

determining a first leader number from the received decree promises, the first leader number being a largest value in previous leader numbers or a value appearing most frequently in the decree promises, and determining the second decree number based on first previous decree numbers corresponding to the first leader number.

4. The method according to claim 2, wherein the determining the second decree number comprises:

in response to receiving an $(N+1)^{th}$ previous decree number, determining that a largest value in the previous decree numbers in received (N+1) decree promises is the second decree number, (N+1) being the preset quantity.

5. The method according to claim 2, wherein the determining the second decree number comprises:

in response to a quantity of decree promises corresponding to received previous decree numbers being greater than the preset quantity, determining, as the second decree number, a largest value of decree numbers that corresponds to an estimated quantity of votes not less than the preset quantity and that is in the received previous decree numbers.

6. The method according to claim 5, wherein the determining, as the second decree number, the largest value of decree numbers comprises:

ranking the previous decree numbers according to values, and determining that a previous decree number ranked $(N+1)^{th}$ in ascending order is the second decree number, (N+1) being the preset quantity.

7. The method according to claim 1, further comprising, after the enabling the fast write operation:

transmitting a ballot request, the ballot request including a fast write identifier, the first decree number, a third decree number greater than the second decree number, and a decree value corresponding to the third decree number, the ballot request requesting the other nodes to record the decree value in a decree corresponding to the third decree number; and performing a write operation in the decree corresponding to the third decree number in response to receiving at least the preset quantity of votes that comprise votes of the third decree number.

8. The method according to claim 1, further comprising, prior to determining that the current node has been elected as the leader node:

determining whether the current node is the leader node; and writing the data operation request according to preset operations of the consistency protocol in response to determining that the current node is not the leader node.

9. The method according to claim 8, wherein the preset operations comprise transmitting a first ballot request, and the method further comprises:

determining, in response to determining that the current node is not the leader node and based on processing load of the current node, whether the current node is to be elected as the leader node;

writing election information into a decree value of the first ballot request in response to determining that the current node is to be elected as the leader node; and determining, in response to receiving votes with respect to the first ballot request from at least the preset quantity of nodes, that the current node becomes the leader node.

10. The method according to claim 1, further comprising:

extracting, in response to receiving a second decree prepare request from a second node, a fourth decree number from the second decree prepare request, the second decree prepare request indicating a request from the second node to other nodes to make a decree promise to no longer accept a fast write operation initiated by a leader node whose leader number is less than the fourth decree number, and the fourth decree number representing a leader number of the second node; and comparing the fourth decree number with a second previous leader number stored in the current node, and determining, based on a comparison result, whether to transmit a second decree promise to the second node.

11. The method according to claim 10, wherein the determining, based on the comparison result, whether to transmit the second decree promise comprises:

discarding the second decree prepare request based on the fourth decree number being less than the second previous leader number; and transmitting the second decree promise to the second node based on the fourth decree number being greater than or equal to the second previous leader number, the second decree promise including the fourth decree number and indicating a promise to no longer accept the fast write operation initiated by the leader node whose leader number is less than the fourth decree number.

12. The method according to claim 11, wherein the second decree promise further includes a second previous decree number, the second previous decree number indicating that the current node has voted for performing a write operation in a decree corresponding to the second previous decree number.

13. The method according to claim 1, further comprising:

extracting, in response to receiving a second ballot request comprising a fast write identifier, a fifth decree number, a sixth decree number greater than the fifth decree number, and a decree value corresponding to the sixth decree number from the second ballot request, the fifth decree number representing a leader number of a transmission node of the second ballot request, and the leader number representing a number of a decree at which the transmission node that becomes the leader node is located; and comparing the fifth decree number with a previous leader number stored in the current node, and determining, based on a comparison result, whether to record the decree value in a decree corresponding to the sixth decree number.

14. The method according to claim 13, wherein the determining, based on the comparison result, whether to record the decree value comprises:

discarding the second ballot request based on the fifth decree number being less than the previous leader number; and transmitting a vote to the transmission node based on the fifth decree number being greater than or equal to the previous leader number, and performing an operation of recording vote information in the decree corresponding to the sixth decree number, the vote including the sixth decree number and the fast write identifier, and the vote information comprising the fifth decree number, the decree value, and the fast write identifier.

15. A distributed processing apparatus based on a consistency protocol, the apparatus being implemented as a current node and comprising:

at least one memory configured to store program code; and at least one processor configured to read the program code and operate as instructed by the program code, the program code comprising:

first determining code configured to cause at least one of the at least one processor to determine, based on receiving a data operation request, that the current node has been elected as a leader node and the current node has not received decree promises from at least a preset quantity of nodes, and select a first decree number as a new decree number, wherein a decree number is a number that continuously increases for each decree and each decree number is unique;

first transmitting code configured to cause at least one of the at least one processor to transmit a decree prepare request including the first decree number, the decree prepare request requesting other nodes to make a decree promise to no longer accept a fast write operation initiated by a leader node whose leader number is less than the first decree number, the fast write operation being an operation to directly initiate a ballot for a particular decree while skipping prepare and promise operations for the particular decree, the first decree number representing a leader number of the current node, and the leader number representing a number of a decree at which the current node that becomes a leader node is located; and enabling code configured to cause at least one of the at least one processor to, in response to receiving decree promises, including the first decree number, from at least the preset quantity of nodes among the other nodes, enable the fast write operation from a subsequent decree number of a second decree number determined based on the decree promises including the first decree number, wherein the second decree number is greater than the first decree number, wherein based on the fast write operation being enabled, the current node initiates a ballot for the subsequent decree number while skipping transmitting a prepare request and obtaining promises for the subsequent decree number.

16. The apparatus according to claim 15, wherein a decree promise includes the first decree number and a previous decree number, the previous decree number indicating that a node transmitting the decree promise has voted for performing a write operation in a decree corresponding to the previous decree number, and wherein the second decree number is determined based on previous decree numbers in the decree promises.

17. The apparatus according to claim 15, wherein the program code further comprises:

second transmitting code configured to cause at least one of the at least one processor to transmit a ballot request, the ballot request including a fast write identifier, the first decree number, a third decree number greater than the second decree number, and a decree value corresponding to the third decree number, the ballot request requesting the other nodes to record the decree value in a decree corresponding to the third decree number; and performing code configured to cause at least one of the at least one processor to perform a write operation in the decree corresponding to the third decree number in response to receiving at least the preset quantity of votes that comprise votes of the third decree number.

18. The apparatus according to claim 15, wherein the program code further comprises:

second determining code configured to cause at least one of the at least one processor to determine whether the current node is the leader node; and writing code configured to cause at least one of the at least one processor to write the data operation request according to preset operations of the consistency protocol in response to determining that the current node is not the leader node.

19. A non-transitory computer readable storage medium storing instructions, the instructions being executable by at least one processor to cause the at least one processor to implement a current node and perform:

determining, based on receiving a data operation request, that the current node has been elected as a leader node and the current node has not received decree promises from at least a preset quantity of nodes, and selecting a first decree number as a new decree number, wherein a decree number is a number that continuously increases for each decree and each decree number is unique;

transmitting a decree prepare request including the first decree number, the decree prepare request requesting other nodes to make a decree promise to no longer accept a fast write operation initiated by a leader node whose leader number is less than the first decree number, the fast write operation being an operation to directly initiate a ballot for a particular decree while skipping prepare and promise operations for the particular decree, the first decree number representing a leader number of the current node, and the leader number representing a number of a decree at which the current node that becomes a leader node is located; and in response to receiving decree promises, including the first decree number, from at least the preset quantity of nodes among the other nodes, enabling the fast write operation from a subsequent decree number of a second decree number determined based on the decree promises including the first decree number, wherein the second decree number is greater than the first decree number, wherein based on the fast write operation being enabled, the current node initiates a ballot for the subsequent decree number while skipping transmitting a prepare request and obtaining promises for the subsequent decree number.

20. A distributed processing apparatus based on a consistency protocol, the apparatus comprising:

at least one processor; and at least one memory configured to store instructions executable by the at least one processor to cause the at least one processor to perform the method according to claim 1.

* * * * *